United States Patent
Mano

(10) Patent No.: US 9,453,471 B2
(45) Date of Patent: Sep. 27, 2016

(54) CONTROL DEVICE AND CONTROL METHOD FOR INTERNAL COMBUSTION ENGINE

(71) Applicant: NISSAN MOTOR CO., LTD., Yokohama-shi, Kanagawa (JP)

(72) Inventor: Tadaki Mano, Sagamihara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/764,359

(22) PCT Filed: Jan. 10, 2014

(86) PCT No.: PCT/JP2014/050286
§ 371 (c)(1),
(2) Date: Jul. 29, 2015

(87) PCT Pub. No.: WO2014/125849
PCT Pub. Date: Aug. 21, 2014

(65) Prior Publication Data
US 2015/0369148 A1    Dec. 24, 2015

(30) Foreign Application Priority Data

Feb. 18, 2013   (JP) .................................. 2013-028555

(51) Int. Cl.
*F02D 41/00*    (2006.01)
*F02D 15/02*    (2006.01)
(Continued)

(52) U.S. Cl.
CPC ............. *F02D 41/004* (2013.01); *F02D 15/02* (2013.01); *F02D 41/0032* (2013.01);
(Continued)

(58) Field of Classification Search
CPC ............. F02D 41/004; F02D 41/0042; F02D 41/1486; F02D 41/345; F02D 41/0045; F02D 41/003; F02D 41/0032; F02D 41/0037; F02D 15/02; F02D 15/00; F02D 35/0015; F02M 25/0854; F02M 25/089; F02M 25/0818; F02M 25/0836; F02M 25/0872; F02M 61/04; F02M 61/14
USPC .................................. 123/520, 519, 518, 516
See application file for complete search history.

(56) References Cited

U.S. PATENT DOCUMENTS

| | | | |
|---|---|---|---|
| 2011/0126806 A1* | 6/2011 | Lee | F02D 15/02 123/48 B |
| 2013/0245922 A1* | 9/2013 | Irie | F02D 41/0062 701/108 |
| 2015/0377175 A1* | 12/2015 | Mano | F02D 41/401 123/294 |

FOREIGN PATENT DOCUMENTS

| | | |
|---|---|---|
| JP | H04-358753 A | 12/1992 |
| JP | H11-280532 A | 10/1999 |

(Continued)

OTHER PUBLICATIONS

U.S. Appl. No. 14/764,343, filed Jul. 29, 2015, Mano.
(Continued)

*Primary Examiner* — Lindsay Low
*Assistant Examiner* — George Jin
(74) *Attorney, Agent, or Firm* — Drinker Biddle & Reath LLP

(57) ABSTRACT

A control device for an internal combustion engine provided with an evaporated fuel processing device arranged to temporarily store an evaporated fuel generated in a fuel tank, to purge the evaporated fuel during drive of the engine, and to introduce the evaporated fuel to an intake system, and a variable compression ratio mechanism arranged to vary a mechanical compression ratio, the control device includes: a section configured to sense a state in which the evaporated fuel is accumulated in the evaporated fuel processing device, during a drive of the engine after a warming-up of the internal combustion engine is finished, the control device being arranged to purge the evaporated fuel by decreasing the mechanical compression ratio by the variable compression ratio mechanism when it is sensed that the evaporated fuel is accumulated.

6 Claims, 3 Drawing Sheets

(51) Int. Cl.
    *F02D 41/14*     (2006.01)
    *F02M 25/08*     (2006.01)
    *F02D 23/00*     (2006.01)
    *F02B 75/12*     (2006.01)

(52) U.S. Cl.
    CPC ..... *F02D 41/0042* (2013.01); *F02D 41/1486* (2013.01); *F02M 25/089* (2013.01); *F02M 25/0854* (2013.01); *F02B 2075/125* (2013.01); *F02D 23/00* (2013.01); *F02M 25/0818* (2013.01); *Y02T 10/123* (2013.01)

(56) References Cited

FOREIGN PATENT DOCUMENTS

| | | |
|---|---|---|
| JP | 2002-276479 A | 9/2002 |
| JP | 2004-116434 A | 4/2004 |
| JP | 2006-348901 A | 12/2006 |
| JP | 2008-002437 A | 1/2008 |

OTHER PUBLICATIONS

U.S. Appl. No. 14/768,279, filed Aug. 17, 2015, Mano et al.
U.S. Appl. No. 14/774,770, filed Sep. 11, 2015, Mano et al.

\* cited by examiner

CONTROL DEVICE AND CONTROL METHOD FOR INTERNAL COMBUSTION ENGINE

TECHNICAL FIELD

This invention relates to an internal combustion engine provided with an evaporated fuel processing device arranged to temporarily store an evaporated fuel generated in a fuel tank, to purge the evaporated fuel during drive of the engine, and to introduce the evaporated fuel to an intake system, more specifically to a control device and a control method for an internal combustion engine provided with a variable compression ratio mechanism.

BACKGROUND ART

For example, a patent document 1 and so on discloses an evaporated fuel processing device arranged to temporarily store an evaporated fuel generated in a fuel tank in a canister and so on, to purge the evaporated fuel during drive of the engine, and to introduce the evaporated fuel to an intake system.

In particular, the patent document 1 relates to the evaporated fuel processing device of the internal combustion engine provided with a turbocharger. The patent document 1 has a configuration including a main purge passage arranged to introduce the evaporated fuel purged from the canister to a portion downstream of a throttle valve in a non-supercharging (non-pressure-charging) region; and a sub purge passage arranged to introduce the evaporated fuel to a portion upstream of a compressor of the turbocharger in a supercharging (pressure-charging) region in which the introduction to this downstream portion of the throttle valve cannot be performed.

On the other hand, conventionally, the various type variable compression ratio mechanisms arranged to vary a mechanical compression ratio of the internal combustion engine has been known. For example, the present applicant has proposed a variable compression ratio mechanism arranged to displace a piston upper dead center in the upward and downward directions by varying a link geometry of the multi-link type piston crank mechanism. Moreover, there is known a variable compression ratio mechanism arranged to similarly vary a mechanical compression ratio by displacing a position of the cylinder with respect to the center position of the crank shaft in the upward and downward directions.

In the evaporation fuel processing device, a storage portion such as a canister which temporarily stores the evaporation fuel has, as a matter of course, a constant capacity (volume). It is not preferable that the evaporated fuel is accumulated to exceed this capacity, since the evaporation fuel outflows to the outside. Accordingly, it is necessary to surely purge during the drive of the internal combustion engine.

However, the maximum amount of the evaporated fuel which can be introduced into the intake system of the internal combustion engine is limited to the constant (some) rate with respect to the intake air quantity so that the deterioration of the controllability of the air fuel ratio is avoided, so that the fuel injection amount from the fuel injection valve is not smaller than the minimum injection amount, and so on. Accordingly, in a case where the frequency of the purge is small, it is not possible to sufficiently purge.

In particular, in a case where the internal combustion engine is provided with a turbocharger, in a supercharging (pressure-charging) region in which the pressure becomes the positive pressure, it is not possible to introduce the evaporated fuel to a portion downstream of the throttle valve. Accordingly, the opportunity of the purge becomes small. The purge is easy to become insufficient relative to the natural intake engine. In the patent document 1, the sub purge passage is provided. With this, the purge is performed in wider driving region. However, this may cause the complication of the configuration.

PRIOR ART DOCUMENT

Patent Document

Patent Document 1: Japanese Patent Application Publication No. 4-358753

SUMMARY OF THE INVENTION

In the present invention, a control device for an internal combustion engine provided with an evaporated fuel processing device arranged to temporarily store an evaporated fuel generated in a fuel tank, to purge the evaporated fuel during drive of the engine, and to introduce the evaporated fuel to an intake system, and a variable compression ratio mechanism arranged to vary a mechanical compression ratio, the control device comprises: a means configured to sense a state in which the evaporated fuel is accumulated in the evaporated fuel processing device, the control device being arranged to purge the evaporated fuel by decreasing the compression ratio by the variable compression ratio mechanism when it is sensed that the evaporated fuel is accumulated.

Basically, the compression ratio of the variable compression ratio mechanism is controlled to be an appropriate state in accordance with the driving condition of the internal combustion engine (the load, the engine speed, and so on). However, in the present invention, when the evaporated fuel is accumulated (remains) within the evaporation fuel processing device, the compression ratio is set to the value lower than the original target value. In this way, when the compression ratio of the internal combustion engine is lowered, the thermal efficiency is lowered, and the fuel amount and the intake air amount which are necessary for maintaining the desired torque are increased. Typically, when the driver of the vehicle senses the decrease of the torque according to the decrease of the compression ratio by the decrease of the vehicle speed and the deficiency of the acceleration feeling, the driver increases the accelerator pedal opening degree to maintain the desired torque. With this, the increase of the fuel amount and the increase of the intake air amount are generated. Alternatively, in a system structure in which the necessary throttle opening degree is calculated in consideration of the compression ratio so as to attain the desired torque, the increase of the throttle opening degree is automatically generated in accordance with the decrease of the thermal efficiency by the decrease of the compression ratio.

By the increase of the fuel amount and the intake air quantity which are necessary for the identical torque and engine speed in this way, it is possible to introduce more evaporated fuel to the intake system. Accordingly, it is possible to rapidly purge the evaporated fuel by the low frequency or by (during) the short period.

By the present invention, when the evaporated fuel is accumulated within the evaporation fuel processing device due to the insufficient purge of the evaporation fuel, it is possible to further rapidly purge by decreasing the compression ratio by the variable compression ratio mechanism, and to more surely prevent the outflow of the evaporation fuel to the outside.

DESCRIPTION OF EMBODIMENTS

Hereinafter, one embodiment of the present invention is illustrated in detail based on the drawings.

Figure 1:
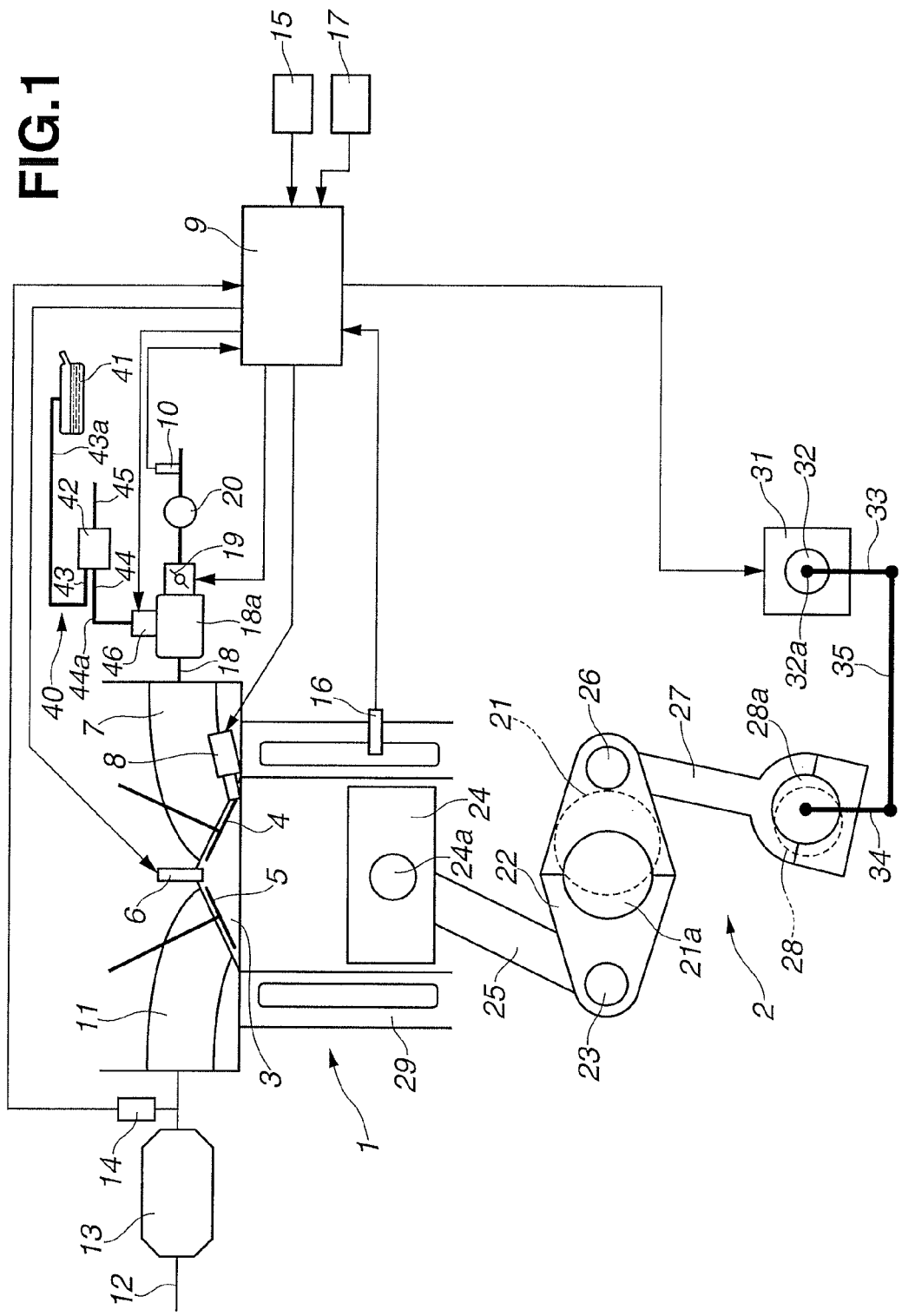
FIG. 1 is a configuration illustrative view showing a system configuration of a control device for an internal combustion engine according to one embodiment of the present invention.

FIG. 1 shows a system configuration of an internal combustion engine for a vehicle to which the present invention is applied. This internal combustion engine 1 is an in-cylinder direct injection type spark ignition internal combustion engine which is provided with a turbocharger, and a variable compression ratio mechanism 2 which uses, for example, a multi-link type piston crank mechanism. In this internal combustion engine 1, a pair of intake valves 4 and a pair of exhaust valves 5 are disposed on a wall surface of a ceiling (top surface) of a combustion chamber 3. An ignition plug 6 is disposed at a central portion which is surrounded by these intake valves 4 and exhaust valves 5.

A fuel injection valve 8 is disposed below an intake port 7 which is arranged to be opened and closed by the intake valves 4. The fuel injection valve 8 is arranged to directly inject the fuel within the combustion chamber 3. The fuel injection valve 8 is an electromagnetic or piezoelectric injection valve which is opened by being applied with a driving pulse signal. The fuel injection valve 8 is arranged to inject the fuel having the amount which is substantially proportional to a pulse width of this driving pulse signal.

An electrically-controlled throttle valve 19 is disposed on the upstream side of a collector portion 18a of an intake air passage 18 connected with the intake port 7. An opening degree of the electrically-controlled throttle valve 19 is controlled by a control signal from an engine controller 9. Moreover, a compressor 20 of a turbocharger is disposed on the upstream side of the electrically controlled throttle valve 19. An air flow meter 10 is disposed on the upstream side of this compressor 20. The air flow meter 10 is arranged to sense an intake air amount.

A catalyst device 13 which is constituted by a three-way catalyst is disposed on the exhaust passage 12 connected to the exhaust port 11. An air-fuel ratio sensor 14 is disposed on an upstream side of the catalyst device 13. The air-fuel ratio sensor 14 is arranged to sense an air-fuel ratio.

The engine controller 9 is arranged to receive signals of sensors such as the air flow meter 10, the air-fuel ratio sensor 14, a crank angle sensor 15 arranged to sense an engine speed, a water temperature sensor 16 arranged to sense a temperature of a coolant (cooling water), and an accelerator opening degree sensor 17 arranged to sense a depression amount of an accelerator pedal which is operated by a driver. The engine controller 9 is configured to appropriately control a fuel injection amount and injection timing by the fuel injection valve 8, an ignition timing by the ignition plug 6, an opening degree of a throttle valve 19, and so on.

In this case, the injection amount of the fuel injection valve 8 is controlled by the known air-fuel ratio feedback control based on the sensing signals of the air-fuel ratio sensor 14 to target the stoichiometric air fuel ratio, except for a part of a driving region. That is, the air-fuel ratio feedback correction coefficient $\alpha$ is calculated based on the sensing signals of the air fuel ratio sensor 14. The fuel injection amount to be injected from the fuel injection valve 8 is obtained by multiplying a basic fuel injection amount by this air fuel ratio feedback correction coefficient $\alpha$. Besides, this invention is similarly applicable to a fuel injection device of a port injection type which is arranged to inject the fuel into the intake port 7, in place of the in-cylinder direct injection type fuel injection device of the example shown in the drawings.

Moreover, this internal combustion engine 1 is provided with an evaporation fuel processing device 40 which is arranged to process without discharging, to the outside, the evaporated fuel generated in a fuel tank 41 of the vehicle during the stop of the vehicle. This evaporation fuel processing device 40 uses the known canister 42 in which the absorbent such as activated carbon is filled so as to temporarily store the evaporated fuel. The canister 42 is provided with a charge port 43 and a purge port 44 which are located on one end of an internal flow passage. The canister 42 is provided with a drain port 45 which is located on the other end of the internal flow passage. The charge port 43 is connected through a charge passage 43a to an upper space of the fuel tank 41. The purge port 44 is connected through a purge passage 44a and a purge control valve 46 to the collector portion 18a of the intake system. Moreover, the drain port 45 is connected directly to the atmosphere, or connected through a drain control valve (not shown) to the atmosphere. For example, the evaporated fuel generated, for example, during the stop of the vehicle, during the refueling is introduced from the charge port 43 to the canister 42. This evaporated fuel is adsorbed by the adsorbent of the respective portions while flowing through the adsorbents toward the drain port 45. The fuel components adsorbed in this way is purged from the adsorbent by incorporating the air from the drain port 45 by the negative pressure generated in the intake system during the drive of the internal combustion engine 1. The fuel component is introduced from the purge port 44 to the intake system of the internal combustion engine. Finally, the fuel component is burned within the combustion chamber 3 with the fuel from the fuel injection valve 8.

On the other hand, the variable compression ratio mechanism 2 uses the known multi-link piston crank mechanism described in a Japanese Patent Application Publication No. 2004-116434. The variable compression ratio mechanism 2 includes a lower link 22 rotatably supported by a crank pin 21a of the crank shaft 21; an upper link 25 connecting an upper pin 23 provided at one end portion of the lower link 22, and a piston pin 24a of the piston 24; a control link 27 having one end connected to a control pin 26 provided to the other end portion of the lower link 22; and a control shaft 28 swingably supporting the other end of the control link 27. The crank shaft 21 and the control shaft 28 are rotatably supported through a bearing configuration (not shown) within the crank case located at a lower portion of the cylinder block 29. The control shaft 28 includes an eccentric shaft portion 28a whose position is varied in accordance with the pivot movement of the control shaft 28. The end portion of the control link 27 is rotatably mounted, specifically, in this eccentric shaft portion 28a. In the above-described variable compression ratio mechanism 2, the upper dead center of the piston 24 is displaced in the upward and downward directions in accordance with the pivot movement of the control shaft 28. Accordingly, the mechanical compression ratio is varied.

An electric motor 31 is disposed at a lower portion of the cylinder block 29. The electric motor 31 serves as a driving mechanism arranged to control to vary a compression ratio of the variable compression ratio mechanism 2. The electric motor 31 includes a rotation center axis (shaft) which is parallel with the crank shaft 21. A speed reduction device 32 is connected to the electric motor 31 to be arranged in series with the electric motor 31 in the axial direction. This speed reduction device 32 is, for example, a wave gear mechanism having a large speed reduction mechanism. The speed reduction device 32 includes a speed reduction device output shaft 32a positioned coaxially with an output shaft (not shown) of the electric motor 31. Accordingly, the speed reduction device output shaft 32a and the control shaft 28 are positioned in parallel with each other. A first arm 33 fixed to the speed reduction device output shaft 32a, and a second arm 34 fixed to the control shaft 28 are connected with each other by an intermediate link 35 so that the speed reduction device output shaft 32a and the control shaft 28 are pivoted in conjunction with each other.

That is, when the electric motor 31 is rotated, the speed from the electric motor 31 is largely reduced by the speed reduction device 32, and the angle of the speed reduction device output shaft 32a is varied. This pivot movement of the speed reduction device output shaft 32a is transmitted from the first arm 33 through the intermediate link 35 to the second arm 34, so that the control shaft 28 is pivoted. With this, as described above, the mechanical compression ratio of the internal combustion engine 1 is varied. Besides, in the example shown in the drawing, the first arm 33 and the second arm 34 extend in the same direction. Accordingly, for example, when the speed reduction device output shaft 32a is pivoted in the clockwise direction, the control shaft 28 is pivoted in the clockwise direction. However, it is possible to constitute the link mechanism to pivot the speed reduction output shaft 32a and the control shaft 28 in the counter-clockwise direction.

The target compression ratio of the variable compression ratio mechanism 2 is set in the engine controller 9 based on the engine driving condition (for example, the desired load and the engine speed). The electric motor 31 is drivingly controlled to attain this target compression ratio.

Figure 2:
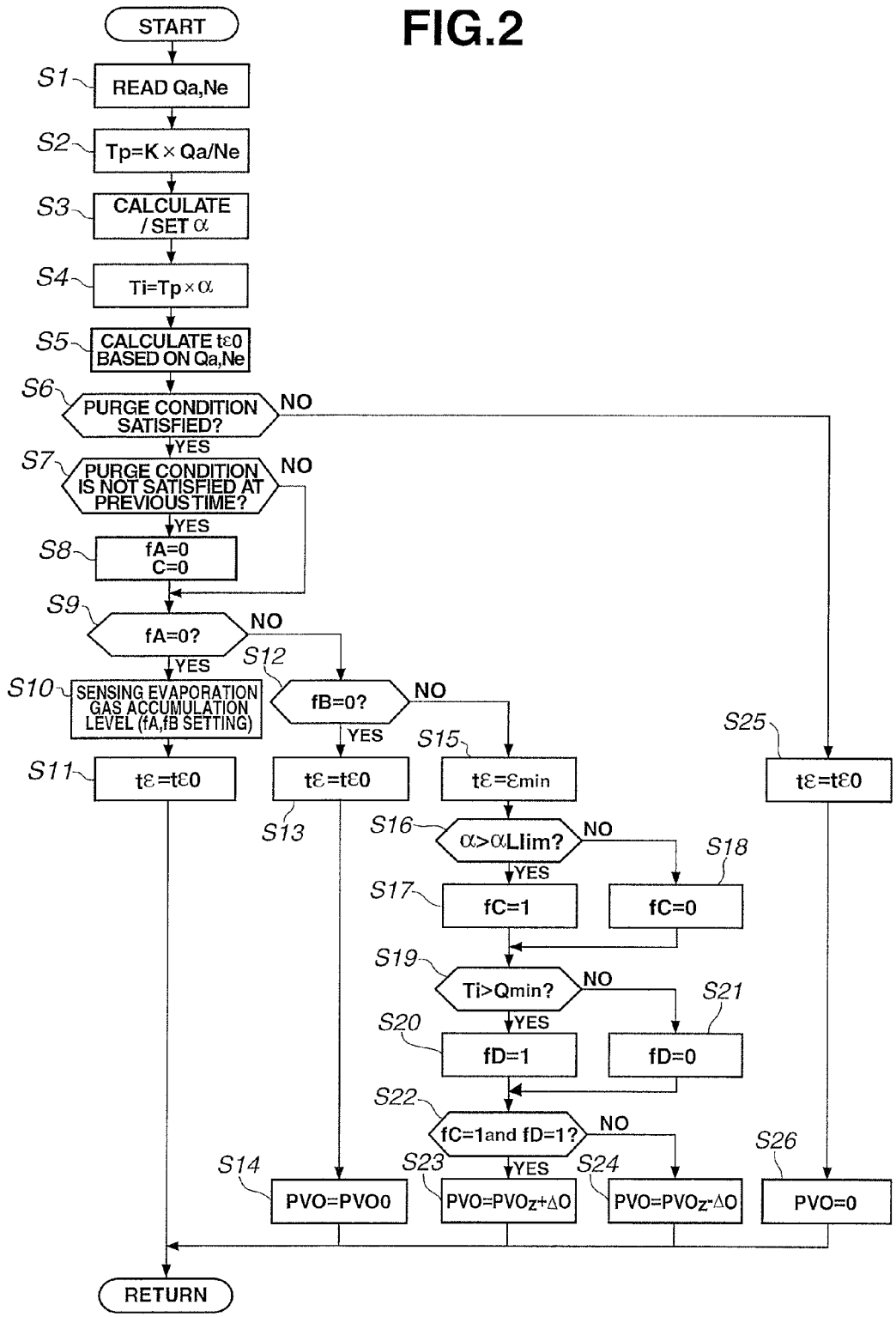
FIG. 2 is a flowchart showing a flow of the control in this embodiment.

FIG. 2 is a flowchart showing a flow of the control of this embodiment which is repeated in the engine controller 9 at each predetermined time period during the drive of the internal combustion engine.

First, at step 1, the intake air quantity Qa and the engine speed (the rotation speed) Ne are read. The intake air quantity Qa is a detection value of the air flow meter 10. The rotation speed Ne is sequentially (successively) calculated from the detection signal of the crank angle sensor 15.

At step 2, a basic fuel injection pulse width Tp corresponding to the above-described basic fuel injection amount is calculated from the intake air quantity Qa, the rotation speed Ne, and a coefficient K. The basic fuel injection pulse width Tp is a driving pulse width of the fuel injection valve 8 which corresponds to the fuel injection amount at which the air fuel ratio becomes the stoichiometric air fuel ratio.

At step 3, the above-described air fuel ratio feedback correction coefficient $\alpha$ is calculated or set. When the air fuel ratio feedback control condition is satisfied, the air fuel ratio feedback correction coefficient $\alpha$ for setting the air fuel ratio to the stoichiometric air fuel ratio is calculated. When the air fuel ratio feedback control condition is not satisfied, the control becomes the open loop control. Accordingly, the air fuel ratio feedback correction coefficient $\alpha$ is set to 1.

At step 4, the fuel injection pulse width Ti is calculated by multiplying the basic fuel injection pulse width Tp by the air fuel ratio feedback correction coefficient $\alpha$. The injection valve open drive signal is transmitted to the fuel injection valves 8 of the cylinders at the fuel injection timings of the cylinders by the fuel injection control routine (not shown), so that the fuel injection is performed.

Besides, when the evaporated fuel component is introduced by the purge of the canister 42 from the canister 42's side to the collector portion 18a, the air fuel ratio feedback correction coefficient $\alpha$ becomes small value by the function of the air fuel ratio feedback control in accordance with that purge amount, so that the fuel injection pulse width Ti is decreased.

At step 5, the basic target compression ratio tε0 is calculated based on the intake air quantity Qa and the rotation speed Ne. In particular, the basic target compression ratio tε0 corresponding to the intake air quantity Qa and the rotation speed Ne at that time is looked up from the control map in which the basic target compression ratio tε0 is assigned as using, as parameters, the intake air quantity Qa and the rotation speed Ne which correspond to the load. The basic target compression ratio tε0 is a compression ratio by which the knocking is not generated under the corresponding intake air quantity Qa (the load) and the rotation speed Ne, and by which the thermal efficiency becomes best. The basic target compression ratio was previously adjusted by the experiment.

At step 6, it is judged whether or not a predetermined purge condition to permit the introduction of the purged fuel component to the intake system is satisfied. In particular, it is judged that the purge condition is satisfied when the warming of the internal combustion engine 1 is finished, when the air fuel ratio feedback control condition is satisfied, and when the pressure of the collector portion 18a is equal to or smaller than the predetermined pressure (the negative pressure lower than the atmospheric pressure). When the purge condition is satisfied, the process proceeds to step 7. When the purge condition is not satisfied, the process proceeds to step 25.

At step 25 which is performed when the purge condition is not satisfied, the target compression ratio tε is set to the basic target compression ratio tε0. By the compression ratio control routine (not shown), the rotation amount of the electric motor 31, that is, the position of the control shaft 28 is controlled in accordance with this target compression ratio tε by the compression ratio control routine (not shown). At step 26, the opening degree PVO of the purge control valve 46 is set to 0 (fully close). That is, at this time, the purge of the canister 42 is not performed. Moreover, the mechanical compression ratio becomes the basic target compression ratio tε0.

On the other hand, at step 7, it is judged whether or not the purge condition is not satisfied (the purge condition is failed) at a timing at which this routine is performed at the previous time. Only at the first time immediately after the purge condition is satisfied, the judgment of this step 7 becomes YES. When the judgment of step 7 is YES, the process proceeds to step 8. When the judgment of step 7 is NO, the process skips step 8.

At step 8, the evaporated gas storage level detection end flag fA is set to 0. Moreover, the counter C is set to 0. The evaporated gas storage level detection end flag fA is a flag set to 1 when the evaporated gas storage level detection is finished at the subroutine of step 10 described later (the evaporated gas storage level detection operation). The counter C is similarly used in the sub routine at step 10.

At step 9, it is judged whether or not the evaporated gas storage level detection end flag fA is 0. Immediately after the purge condition is satisfied, the evaporated gas storage level detection end flag fA is 0. Accordingly, the judgment of this step becomes YES. The process proceeds to step 10. When the evaporated gas storage level detection is finished (that is, fA=1), the process proceeds to step 12.

Figure 3:
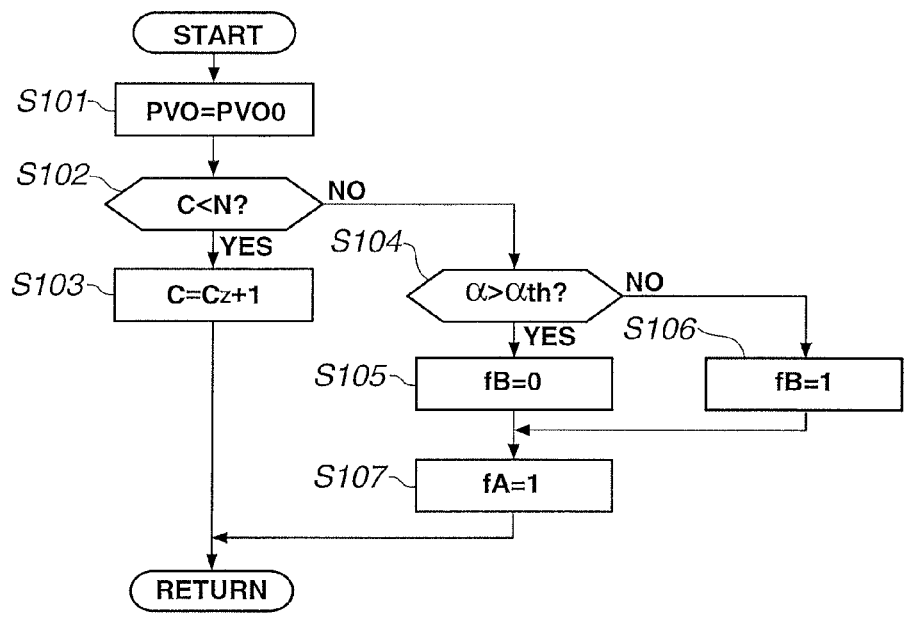
FIG. 3 is a flowchart showing a sub routine of an evaporation gas accumulation level detection.

At step 10, the evaporated gas storage level detection operation of the sub routine shown in FIG. 3 is performed. This operation is described later. By this operation, when it is judged that the much evaporated fuel component is accumulated within the canister 42, the evaporated gas accumulating flag fB is set to 1. Then, when this evaporated gas accumulating level detection operation is finished, the evaporated gas accumulating level detection end flag fA is set to 1. Accordingly, until the evaporated gas accumulating level detection operation is finished, the process repeats the operation from step 9 to step 10.

At step 11 corresponding to the operation during the evaporated gas accumulating level detection operation, the target compression ratio tε is set to the basic target compression ratio tε0. That is, during the evaporated gas accumulating level detection operation, the compression ratio remains to the basic target compression ratio tε0.

At step 12 which is performed when the judgment of the step 9 is NO (when the evaporated gas accumulating level detection operation is already finished), it is judged whether or not the evaporated gas accumulating flag fB is 0. When the evaporated gas accumulating flag fB is 0 (that is, little fuel component is accumulated within the canister 42), the process proceeds to step 13. When the evaporated gas accumulating flag fB is 1, the process proceeds to step 15.

At step 13, the target compression ratio tε is set to the basic target compression ratio tε0. Moreover, at step 14, the opening degree of the purge control valve 46 is set to the basic purge control valve opening degree PVO0. Accordingly, when the evaporated gas accumulating flag fB is 0, the purge of the canister 42 at the basic purge control valve opening degree is performed while the compression ratio remains the basic compression ratio tε0.

The basic opening degree PVO0 of the purge control valve 46 is the opening degree determined in accordance with the intake air quantity Qa. Moreover, the basic opening degree PVO0 of the purge control valve 46 is the opening degree which is set so that the stability of the control of the air fuel ratio is not disturbed and the fuel injection pulse width Ti does not become lower than the minimum injection pulse width Qmin of the fuel injection valve even when the much evaporated fuel component is accumulated within the canister 42 (accordingly, the fuel concentration of the purge gas is high). By a purge control valve control routine (not shown), a command signal according to the opening degree PVO is transmitted to the purge control valve 46. The opening degree of the purge control valve 46 is controlled.

Next, at step 15 which is performed when the judgment of step 12 is NO (the much fuel component remains within the canister 42), the target compression ratio tε is set to the minimum compression ratio εmin. This minimum compression ratio εmin is the minimum compression ratio which is controllable in the variable compression ratio mechanism 2.

The driving condition (Qa, Ne) at which the purge condition is satisfied is the driving condition on the relatively low load side. Accordingly, the corresponding basic target compression ratio tε0 is relatively high. When the target compression ratio tε is set to the minimum compression ratio εmin in this driving condition, the thermal efficiency is lowered, so that the generated torque is lowered than that in the normal state. Accordingly, the driver of the vehicle further depresses the accelerator pedal to obtain the desired torque. Consequently, the opening degree of the throttle valve 19 becomes large, so that the intake air quantity Qa is increased. Accordingly, the basic fuel injection pulse width Tp becomes large. When the basic fuel injection pulse width Tp becomes large, the influence on the stability of the control of the air fuel ratio becomes relatively small even when the fuel amount introduced from the canister 42's side by the purge is the same. Consequently, it is possible to increase the purge amount while ensuring the air fuel ratio control stability. Moreover, when the basic fuel injection pulse width Tp becomes large, the fuel injection pulse width Ti supplied from the fuel injection valve 8 becomes large even when the fuel amount introduced from the canister 42's side by the purge is the same. Accordingly, the limitation of the purge amount by the minimum injection pulse width Qmin is relatively relieved. Consequently, it is possible to increase the purge amount without limiting the minimum injection pulse width Qmin.

At step 16, it is judged whether or not the air fuel ratio feedback correction coefficient α which is decreased in accordance with the purge of the fuel component is larger than the predetermined lower limit value αLlim. For ensuring the control stability of the air fuel ratio, the air fuel ratio feedback correction coefficient α which is basically varied around "1" as the center is provided with an upper limit value αHlim (>1) and a lower limit value αLlim (<1). At this step, it is judged whether or not the air fuel ratio feedback correction coefficient α which is influenced by the purge is larger than the lower limit value αLlim, that is, whether or not the air fuel ratio feedback correction coefficient α is the purge amount which is permissible under the control stability of the air fuel ratio.

When the judgment of the step 16 is YES, the process proceeds to step 17. The purge control valve opening degree increase permission first flag fC is set to 1. When the judgment of step 16 is NO, the process proceeds to step 18. The purge control valve opening degree increase permission first flag is set to 0. This purge control valve opening degree increase permission first flag fC shows that the control stability of the air fuel ratio is ensured, and that the opening degree of the purge control valve 46 can be further increased in this view.

Moreover, at step 19, it is judged whether or not the fuel injection pulse width Ti which is decreased in accordance with the purge of the fuel component is larger than a predetermined minimum injection pulse width Qmin. The fuel injection valve 8 cannot inject accurate amount of the fuel when the fuel injection pulse width Ti becomes smaller than the minimum injection pulse width Qmin. At this step, it is judged whether or not the fuel injection pulse width Ti which is influenced by the purge is larger than the predetermined minimum injection pulse width Qmin by which the measurement accuracy of the injection amount can be ensured.

When the judgment of step 19 is YES, the process proceeds to step 20. The purge control valve opening degree increase permission second flag fD is set to 1. When the judgment of step 19 is NO, the process proceeds to step 21. The purge control valve 46 opening degree increase permission second flag fD is set to 0. This purge control valve opening degree increase permission second flag fD shows that the minimum injection pulse width Qmin is ensured, and that the opening degree of the purge control valve 46 can be further increased in this point of view.

At step 22, it is judged whether or not the purge control valve opening degree increase permission first flag fC and the purge control valve opening degree increase permission second flag fD are set to 1. When the both flags are set to 1, the process proceeds to step 23 since the purge amount may be increased. When the one of the both flags is set to 0 or when the both flags are set to 0, the process proceeds to step 24 for conversely decreasing the purge amount.

In particular, at step 23, the opening degree PVO is calculated by adding the predetermined minute amount $\Delta O$ to the previous calculated value PVOz of the opening degree PVO of the purge control valve 46 so as to gradually increase the opening degree PVO. That is, the opening degree PVO of the purge control valve 46 is gradually increased as long as the control stability of the air fuel ratio is ensured, and the minimum injection pulse width Qmin is ensured. Accordingly, as described above, the much purge is performed in a state where the target compression ratio t∈0 is set to the minimum compression ratio ∈min. Besides, the basic purge control valve opening degree PVO0 is used as the initial value of the previous calculated value PVOz at initial step 23.

At step 24, the opening degree PVO is calculated by subtracting the predetermined minute amount $\Delta O$ from the previous calculated value PVOz of the purge control valve opening degree PVO, so as to gradually decrease the opening degree PVO. That is, the purge amount is decreased so that the judgment of the step 22 becomes YES while performing the purge in a state where the target compression ratio t∈0 is set to the minimum compression ratio ∈min.

Next, FIG. 3 shows a sub routine of the evaporated gas accumulating level detection operation of step 10.

This operation is performed when the purge condition is satisfied along the above-described main routine. At step 101, the opening degree PVO of the purge control valve 46 is set to the basic purge control valve opening degree PVO0. With this, the purge is performed under the basic target compression ratio t∈0.

At step 102, it is judged whether or not the value of the counter C which is reset at step 8 is smaller than a predetermined value N. When the counter C is smaller than the predetermined value N, it means (represents) that the sufficient time period is not elapsed since the purge condition is satisfied and the purge is started. The evaporated gas accumulating level cannot be accurately sensed. Accordingly, the judgment of the evaporated gas accumulating level is not performed. At step 103, the value of the counter C is counted up by one. Cz is a previous value of the counter C. Besides, the operation of step 10 shown in FIG. 3 is repeated until the evaporated gas accumulating level sensing end flag fA becomes 1.

When the judgment of step 102 becomes NO (the counter C is equal to or greater than the predetermined value N), the process proceeds from step 102 to step 104. It is judged whether or not the air fuel ratio feedback correction coefficient $\alpha$ is greater than a predetermined threshold value $\alpha$th. Besides, this threshold value $\alpha$th may be a fixed value. This threshold value $\alpha$th may be a value set in consideration of the driving condition such as the intake air quantity Qa. When the evaporated fuel component is not much accumulated within the canister 42, the fuel concentration of the purge gas is low. Even when the purge control valve 46 is controlled to be opened by the basic purge control valve opening degree PVO0, the air fuel ratio feedback correction coefficient $\alpha$ hardly become small. On the other hand, when the much evaporated fuel component is accumulated within the canister 42, the fuel concentration of the purge gas is high. Accordingly, the air fuel ratio feedback correction coefficient $\alpha$ becomes largely small. At step 104, it is judged that the accumulating level of the evaporated fuel component is two stages of high and low by comparing the air fuel ratio feedback correction coefficient $\alpha$ and the threshold value $\alpha$th.

When the judgement of step 104 is YES, the process proceeds to step 105. The evaporated gas accumulating flag fB is set to 0. When the judgment of step 104 is NO, the process proceeds to step 106. The evaporated gas accumulating flag fB is set to 1. This evaporated gas accumulating flag fB is used for the above-described judgment of step 12. Then, at step 107, the evaporated gas accumulating level sensing end flag fA representing that the operation of step 10 is finished is set to 1.

Figure 4:
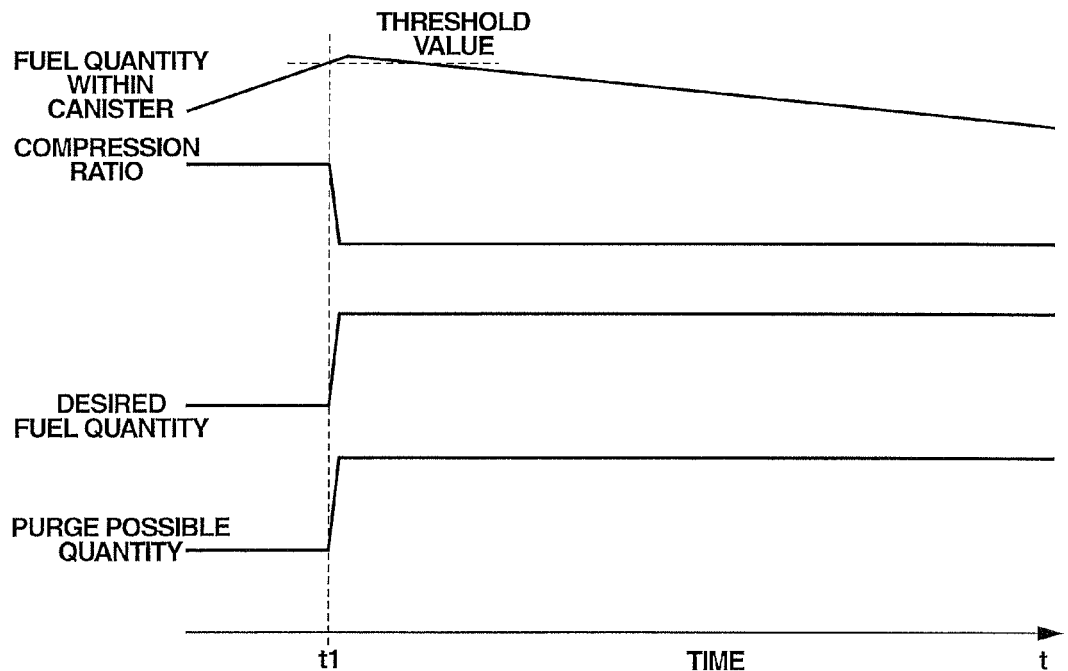
FIG. 4 is a time chart showing variations of a compression ratio and so on in this embodiment.

Next, FIG. 4 is a time chart for illustrating the operation of the above-described embodiment. An uppermost stage of the drawing shows the amount of the evaporated fuel component accumulated within the canister 42. As illustrated based on FIG. 2 and FIG. 3, when the purge condition is satisfied during the engine driving, the purge is performed by setting the purge control valve 46 to the basic purge control valve opening degree PVO0 under the basic target compression ratio t∈0, even when the evaporated gas accumulating flag fB is 0. Accordingly, when the frequency that the purge condition is satisfied, and the period that the purge condition is satisfied are sufficient, the fuel component amount within the canister 42 can be maintained to the relatively low level. On the other hand, when the frequency that the purge condition is satisfied is small, or when the much evaporated fuel is generated within the fuel tank 41 for any reasons, as shown in FIG. 4, the fuel component amount within the canister 42 may exceed some threshold value (this corresponds to threshold value $\alpha$th of the air fuel ratio feedback correction coefficient $\alpha$).

In the example shown in the drawing, the fuel component amount within the canister 42 exceeds the threshold value at time t1. With this, by the above-described operation of step 15, the target compression ratio t∈ becomes the minimum compression ratio ∈min. In a case where the compression ratio is decreased in this way, the thermal efficiency is decreased. Moreover, the generated torque is decreased than that in the normal state. Accordingly, the necessary intake air quantity Qa is increased for maintaining the desired torque. That is, the necessary fuel amount (the summation of the fuel injection amount and the fuel component introduced by the purge) is increased as shown in the drawing. Accordingly, the purge possible amount which can be introduced into the intake system is increased.

In this way, in the above-described embodiment, when the fuel component amount within the canister 42 exceeds some level, the much purge is performed in a state where the compression ratio is lowered. Accordingly, the fuel component within the canister 42 is rapidly decreased. Consequently, when the frequency that the purge condition is satisfied as the internal combustion engine 1 with the turbocharger, it is possible to previously avoid the breaking-through (the outflow of the fuel component to the outside) of the canister 42. Moreover, it is possible to avoid the destabilization of the air fuel ratio control by the much purge, and the excessive decrease of the fuel injection pulse width Ti.

Besides, in the above-described embodiment, when the evaporated fuel component is accumulated at some level within the canister 42, the compression ratio is lowered to the minimum compression ratio $\epsilon$min by which the compression ratio is controllable. This is because the avoidance of the breaking-through of the canister 42 is preferentially performed. However, the present invention is not limited to this. The compression ratio may be lowered to the appropriate level. For example, the level of the fuel component amount accumulating within the canister 42 is linearly sensed. The decreasing width of the compression ratio may be variably controlled in accordance with this sensed level.

Moreover, in the explanation of the above-described embodiment, the driver of the vehicle further depresses the accelerator pedal at the decrease of the torque according to the decrease of the compression ratio. For example, in a system configuration in which the desired torque is determined based on the accelerator pedal opening degree, and the necessary throttle opening degree is calculated in consideration of the compression ratio to attain this desired torque, the increase of the throttle opening degree is automatically generated in accordance with the decrease of the thermal efficiency by the decrease of the compression ratio. The present invention is similarly applicable to the thus-constructed configuration.

Moreover, in the above-described embodiment, the variable compression ratio mechanism 2 which is the multi-link piston crank mechanism is used. However, the preset invention is similarly applicable to any type variable compression ratio mechanism.

The invention claimed is:

1. A control device for an internal combustion engine provided with an evaporated fuel processing device arranged to temporarily store an evaporated fuel generated in a fuel tank, to purge the evaporated fuel during drive of the engine, and to introduce the evaporated fuel to an intake system, and a variable compression ratio mechanism arranged to vary a mechanical compression ratio, the control device comprising:
   a section configured to sense a state in which the evaporated fuel is accumulated in the evaporated fuel processing device, during a drive of the engine after a warming-up of the internal combustion engine is finished,
   the control device being arranged to purge the evaporated fuel by decreasing the mechanical compression ratio by the variable compression ratio mechanism when it is sensed that the evaporated fuel is accumulated.

2. The control device for the internal combustion engine as claimed in claim 1, wherein the evaporated fuel processing device is provided with a purge control valve arranged to open and close a purge passage connected to the intake system; and the decrease of the mechanical compression ratio is performed when the evaporated fuel is accumulated, and when a predetermined purge condition to open the purge control valve is satisfied.

3. The control device for the internal combustion engine as claimed in claim 2, wherein the control device further comprises an air fuel ratio sensor provided in an exhaust system, and an air fuel ratio feedback control section configured to calculate an air fuel ratio feedback correction coefficient based on a sensing signal of the air fuel ratio sensor, and to correct the fuel injection amount; and an opening degree of the purge control valve is increased until the air fuel ratio feedback correction coefficient reaches a predetermined low limit value.

4. The control device for the internal combustion engine as claimed in claim 2, wherein the control device further comprises an air fuel ratio sensor provided in an exhaust system, and an air fuel ratio feedback control section configured to calculate an air fuel ratio feedback correction coefficient based on a sensing signal of the air fuel ratio sensor, and to correct the fuel injection amount; and the opening degree of the purge control valve is increased until the fuel injection amount reaches a minimum injection amount.

5. The control device for the internal combustion engine as claimed in claim 1, wherein the internal combustion engine is provided with a turbocharger; and the purge of the evaporated fuel is performed in a state in which the mechanical compression ratio is decreased in a non-supercharging region.

6. A control method for an internal combustion engine provided with an evaporated fuel processing device arranged to temporarily store an evaporated fuel generated in a fuel tank, to purge the evaporated fuel during drive of the engine, and to introduce the evaporated fuel to an intake system, and a variable compression ratio mechanism arranged to vary a mechanical compression ratio, the control method comprising;
   sensing a state in which the evaporated fuel is accumulated in the evaporated fuel processing device, during drive of the engine after a warming-up of the internal combustion engine is finished,
   purging the evaporated fuel by decreasing the mechanical compression ratio by the variable compression ratio mechanism when it is sensed that the evaporated fuel is accumulated.

* * * * *